United States Patent
Lin (10) Patent No.: US 6,891,531 B2
(45) Date of Patent: May 10, 2005

(54) SENSING AN OBJECT WITH A PLURALITY OF CONDUCTORS

(75) Inventor: Jaoching Lin, San Jose, CA (US)

(73) Assignee: Sentelic Corporation, Taipei (TW)

( * ) Notice: Subject to any disclaimer, the term of this patent is extended or adjusted under 35 U.S.C. 154(b) by 303 days.

(21) Appl. No.: 10/190,251

(22) Filed: Jul. 5, 2002

(65) Prior Publication Data

US 2004/0003949 A1 Jan. 8, 2004

(51) Int. Cl.⁷ .............................................. G09G 5/00
(52) U.S. Cl. ................................. 345/173; 178/18.06
(58) Field of Search ............................. 345/173–179; 178/18.01–18.07, 19.01–19.04, 20.01–20.04, 19.07

(56) References Cited

U.S. PATENT DOCUMENTS

| | | | |
|---|---|---|---|
| 3,497,617 A | 2/1970 | Ellis ............................ 178/19 |
| 3,921,166 A | 11/1975 | Volpe ..................... 340/365 C |
| 4,103,252 A | 7/1978 | Bobick ........................ 331/48 |
| 4,550,221 A | 10/1985 | Mabusth ..................... 178/18 |
| 4,639,720 A | 1/1987 | Rympalski et al. ......... 340/712 |
| 4,680,430 A | 7/1987 | Yoshikawa et al. ........... 178/19 |
| 4,686,332 A | 8/1987 | Greanias et al. ............. 178/19 |
| 4,733,222 A | 3/1988 | Evans ..................... 340/365 C |
| 4,736,191 A | 4/1988 | Matzke et al. .......... 340/365 C |
| 5,016,008 A | 5/1991 | Gruaz et al. ................. 341/33 |
| 5,149,919 A | 9/1992 | Greanias et al. ............. 178/19 |
| 5,349,303 A | 9/1994 | Gerpheide ................... 330/257 |
| 5,374,787 A | 12/1994 | Miller et al. ................. 178/18 |
| 5,495,077 A | 2/1996 | Miller et al. ................. 178/18 |
| 5,565,658 A | 10/1996 | Gerpheide et al. ............ 178/19 |
| 5,914,465 A | 6/1999 | Allen et al. ............... 178/18.06 |
| 5,914,708 A | 6/1999 | LaGrange et al. .......... 345/179 |
| 6,222,528 B1 | 4/2001 | Gerpheide et al. .......... 345/173 |
| 6,239,788 B1 * | 5/2001 | Nohno et al. ............... 345/173 |
| 6,262,717 B1 | 7/2001 | Donohue et al. ........... 345/173 |
| 6,452,514 B1 * | 9/2002 | Philipp ....................... 341/33 |

FOREIGN PATENT DOCUMENTS

| | | | | |
|---|---|---|---|---|
| JP | 59-121484 | * | 7/1984 | ........... G06K/11/06 |
| WO | WO91/03039 | | 3/1991 | |

* cited by examiner

*Primary Examiner*—Alexander Eisen
(74) *Attorney, Agent, or Firm*—Michael Shenker; MacPherson Kwok Chen & Heid LLP (57) ABSTRACT

An object (130), e.g. a human finger or a stylus, is sensed with a plurality of conductors (120, X1, . . . XN). The conductor processing times (TX1, TX2, . . . TXN) but are shifted relative to one other.

34 Claims, 10 Drawing Sheets

SENSING AN OBJECT WITH A PLURALITY OF CONDUCTORS

BACKGROUND OF THE INVENTION

The present invention relates to sensing an object with a plurality of conductors. Some embodiments relate to touch sensitive pads that sense a human finger or a stylus.

Touch sensitive pads are used in computers, microwave ovens, and other devices. A touch sensitive pad allows a user (a human being) to enter information by touching the pad with a finger or a stylus. In computer systems, touch sensitive pads provide a compact alternative to a mouse, and are used extensively in laptop and notebook computers. Some systems allow the user to enter verbal information into a computer by writing the information on a touch sensitive pad. Some devices do not require the user to touch the pad, it is sufficient for the user to place the object (the finger or the stylus) close to the pad. We will still call these pads "touch sensitive" herein.

Figure 1:
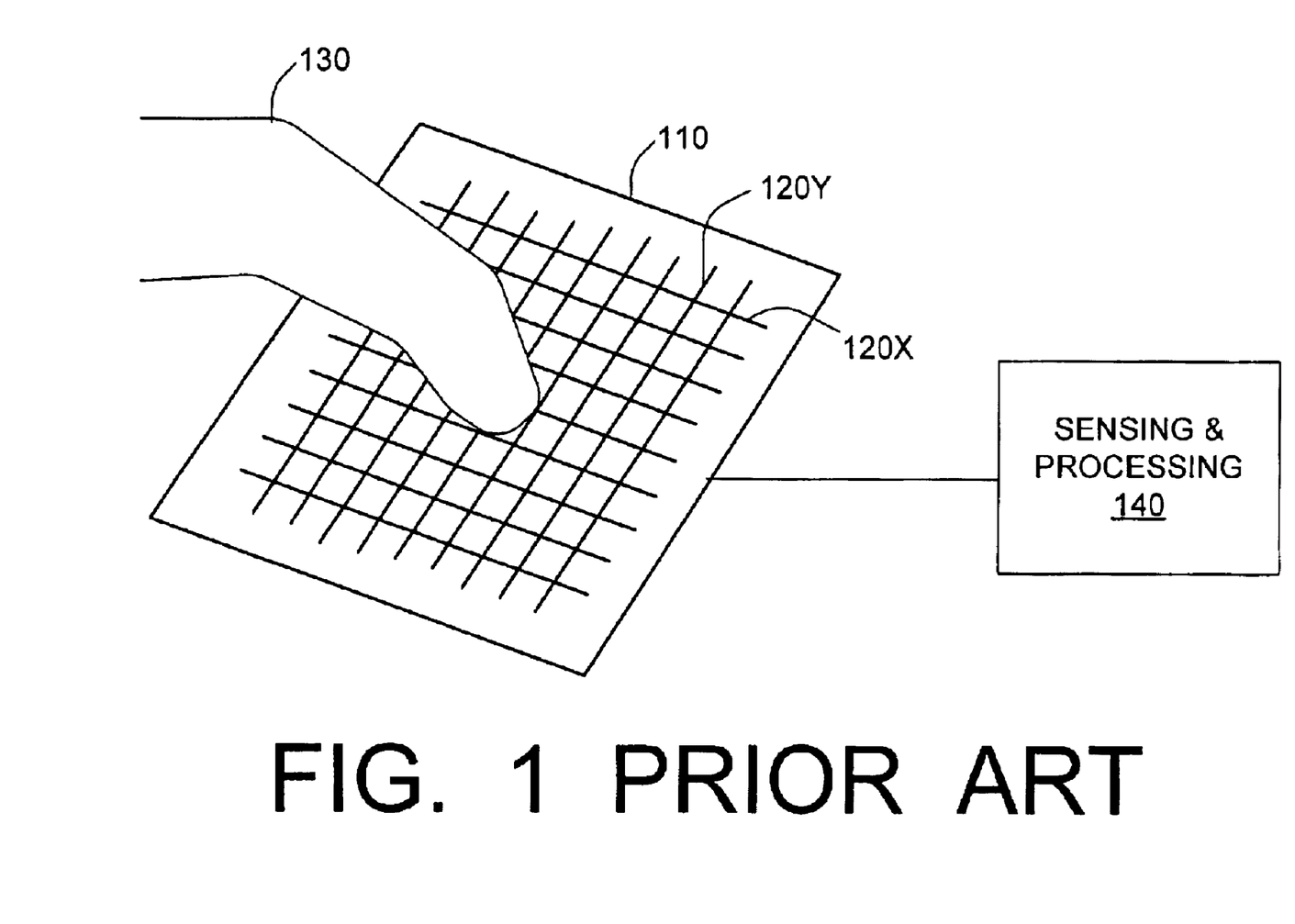
FIG. 1 illustrates a prior art touch sensitive system.

FIG. 1 illustrates an exemplary system with a touch sensitive pad 110. The pad has a number of conductors 120X, 120Y. Conductors 120X are parallel to each other, and conductors 120Y are parallel to each other and perpendicular to conductors 120X. A human finger 130 touches the pad and thereby changes the state of some or all of conductors 120 (i.e. 120X, 120Y). For example, the presence or pressure of finger 130 may change the capacitance of the conductors passing under the finger. Sensing and processing circuit 140 senses the conductors' states and determines the position and, possibly, the pressure of finger 130 on the pad. Circuit 140 then performs an appropriate action, e.g. moving a cursor on a computer screen, turning on a microwave oven, and so on.

Conductors 120 do not have to be arranged as two groups of parallel conductors, but can be arranged radially or in some other fashion.

Figure 2:
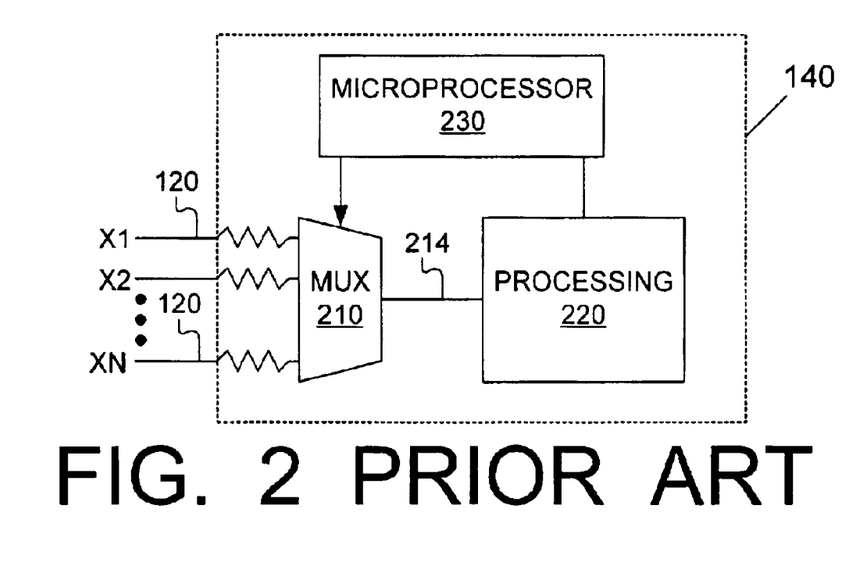
FIG. 2 is a block diagram of a prior art sensing and processing circuit.

FIG. 2 shows a sensing and processing circuit 140 of the type disclosed in U.S. Pat. No. 4,736,191 issued Apr. 5, 1988 to Matzke et al. Conductors 120, shown as X1, . . . XN, are connected through appropriate resistors to inputs of multiplexer 210. Multiplexer 210 selects one conductor at a time, and connects the selected conductor to a line 214. Processing circuit 220 generates a signal indicative of the capacitance on line 214 and hence the capacitance of the selected conductor. The signal is generated as follows. Line 214 is discharged to ground, and then connected to a high voltage provided by microprocessor 230. Circuit 220 generates a pulse indicative of a period of time in which the voltage on line 214 rises to some predetermined value. Microprocessor 230 measures the length of this pulse and stores it as an indication of the capacitance of the selected conductor. After suitable processing, the microprocessor causes multiplexer 210 to select the next conductor, and so on.

Figure 3:
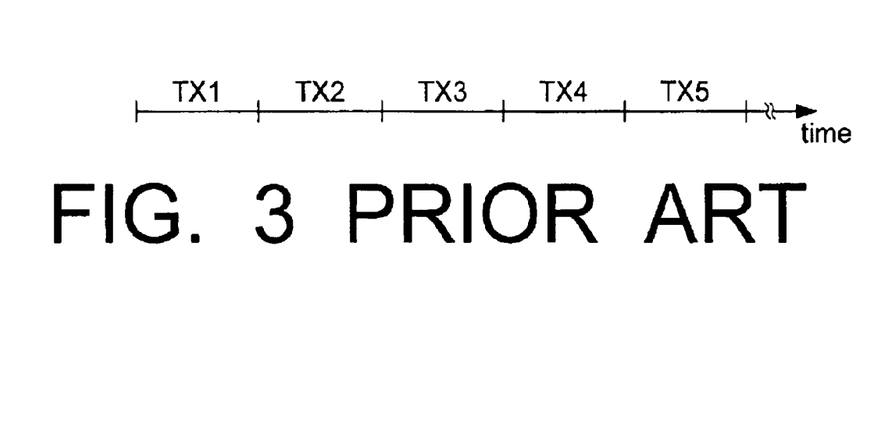
FIG. 3 is a timing diagram for the circuit of FIG. 2.

The conductors are thus processed sequentially, as indicated in the timing diagram of FIG. 3. TX1 is the time of processing the conductor X1, TX2 is the time of processing the conductor X2, and so on.

Figure 4:
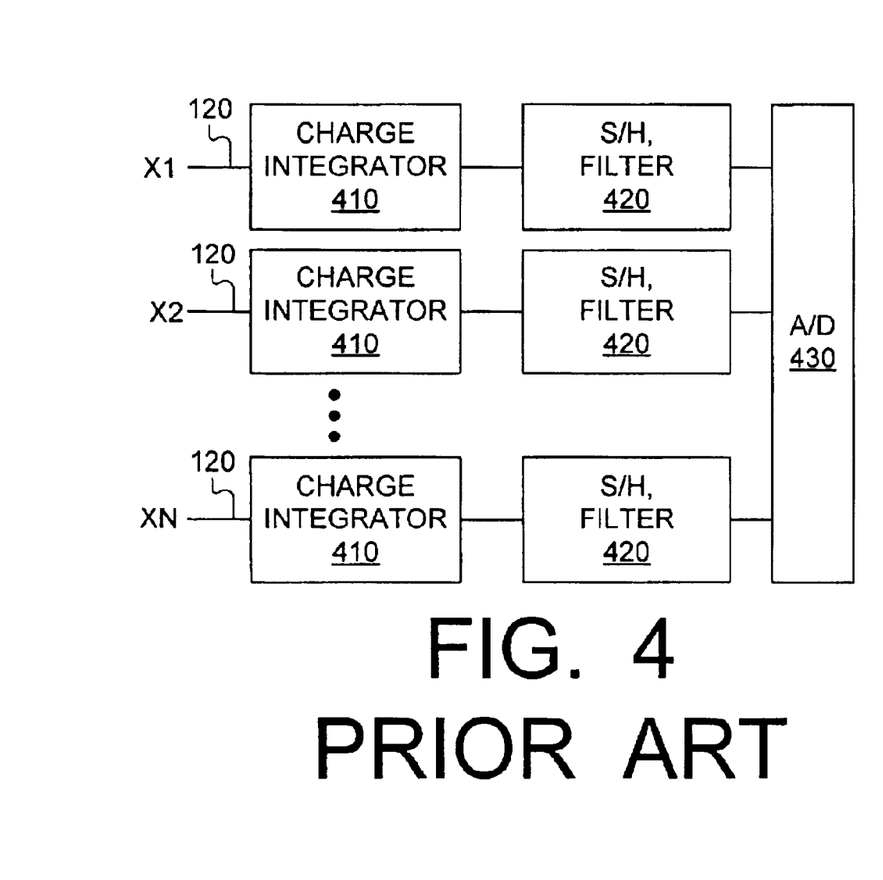
FIG. 4 is a block diagram of another prior art sensing and processing circuit.

FIG. 4 illustrates a system in which the conductors are processed simultaneously. Each conductor 120 is connected to a corresponding charge integrator 410. Each charge integrator 410 generates a voltage indicative of the respective conductor's capacitance, and provides the voltage to a respective circuit 420. Circuits 420 perform sample-and-hold and filtering functions. The outputs of circuits 420 are connected to analog to digital converter 430. See U.S. Pat. No. 5,914,465 issued Jun. 22, 1999 to Allen et al.

Figure 5:
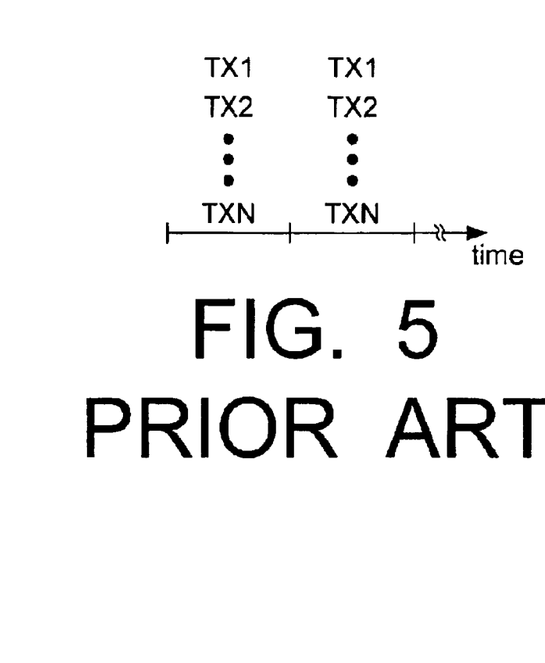
FIG. 5 is a timing diagram for the circuit of FIG. 4.

As illustrated in the timing diagram of FIG. 5, all of the conductors are processed simultaneously.

SUMMARY

This section summarizes some features of the invention. Other features are described in subsequent sections.

The simultaneous processing system of FIG. 4 requires much circuitry. This is particularly undesirable if the analog circuitry (such as the integrators 410) and the digital circuitry are combined on one chip. Manufacturing the analog circuitry with a standard digital circuit process may require a precise analog circuit design or process trimming, which is cumbersome and inefficient for mass production.

On the other hand, the sequential processing systems are slower.

Figure 6:
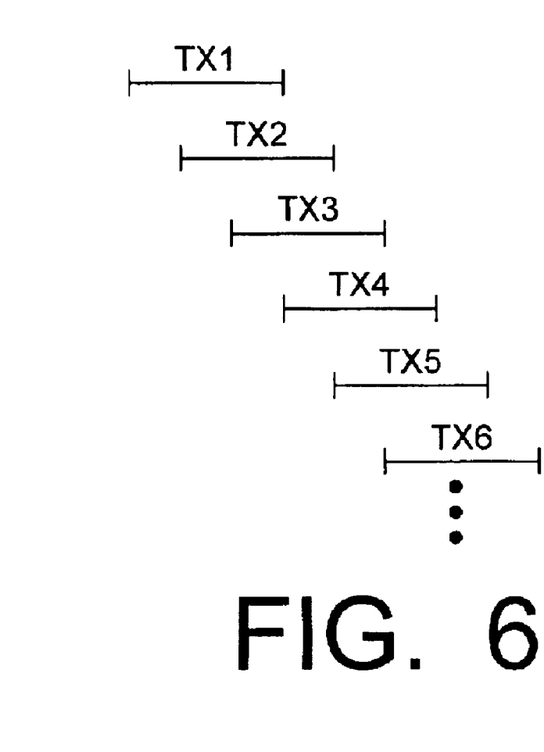
FIGS. 6 and 7 are timing diagrams illustrating some embodiments of the present invention.

In some embodiments of the present invention, the conductors are processed in overlapping periods of time that are shifted relative to one another. An example is shown in FIG. 6. The processing time TX1 of conductor X1 overlaps with the time TX2 for conductor X2, but the time TX2 starts later than TX1. TX3 overlaps with TX2, but starts later than TX2, and so on.

Figure 7:
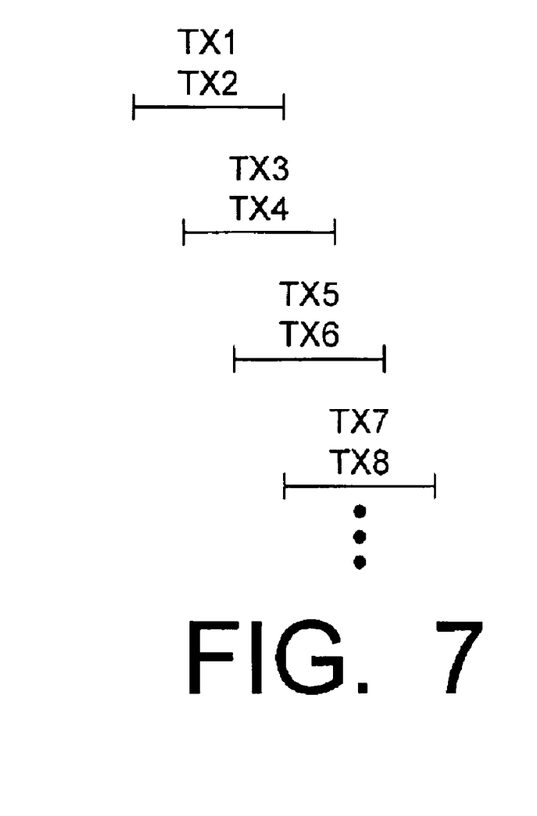

In FIG. 7, the conductors X1, X2 are processed simultaneously (like in FIG. 4). The conductors X3 and X4 are also processed simultaneously. The time "TX3, TX4" overlaps with "TX1, TX2" but starts later than "TX1, TX2". In other embodiments, more than two conductors are processed simultaneously, yet for at least two conductors their processing times overlap but are shifted relative to each other.

Figure 8:
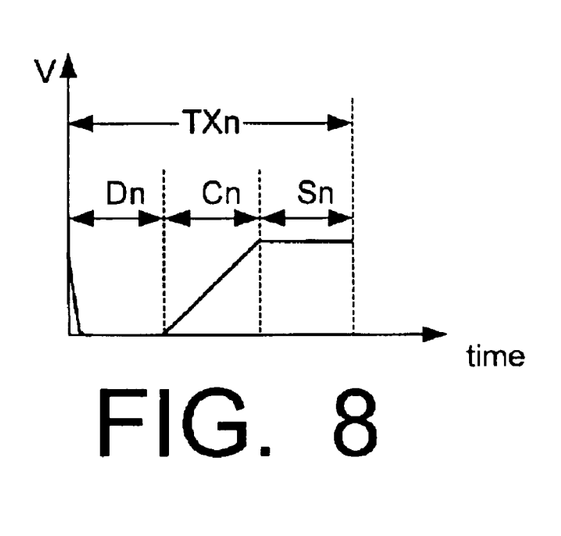
FIG. 8 is a conductor voltage plot in one embodiment of the present invention.
Figure 9:
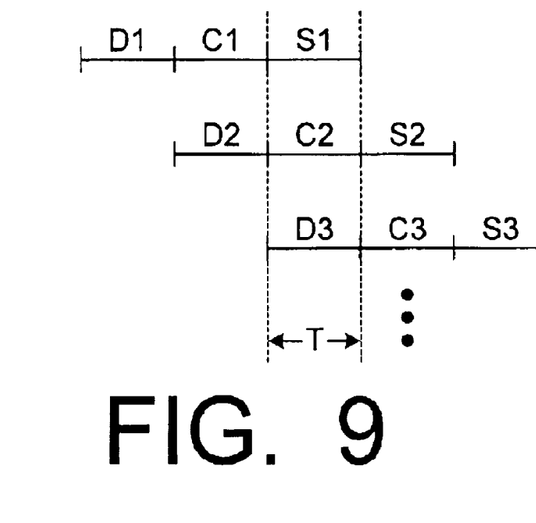
FIG. 9 is a timing diagram for the embodiment of FIG. 8.

In some embodiments of the invention, the processing time overlap allows the conductors to be processed faster than in the sequential systems. The response time to a movement of a finger or a stylus is improved, and/or more time is left for digital and other processing. Also, less circuitry is required than in the simultaneous processing systems. In particular, less analog circuitry is needed, relaxing the analog circuit design and process trimming requirements. In addition, the power driving requirements are reduced compared to the simultaneous processing systems. One embodiment is illustrated in FIG. 8 showing a voltage of a conductor Xn as a function of time. The conductor processing includes a discharge phase Dn, a charging phase Cn, and a sensing phase Sn. In phase Dn, the conductor is discharged to ground. Next, in phase Cn, a predetermined amount of charge is injected into the conductor. Then, in phase Sn, the charge on the conductor is sampled with a sample and hold circuit (not shown). The phases Dn, Cn, Sn are of equal duration. FIG. 9 shows the relative timing of the three phases for the conductors X1, X2, X3. The processing of a conductor is delayed by one phase duration relative to the previous conductor, so that D2 coincides with C1, D3 with C2 and S1, and so on. More generally, the phases Sn, Cn+1, Dn+2 coincide. In each phase period T, at most one conductor is in any given phase (discharge, charge, or sense), so the circuitry for each phase can be shared by different conductors. For example, only one sample and hold circuit is needed. In addition, the current drive requirements for the charging and discharging circuitry (phases Cn and Dn) can be reduced since at most one conductor is charged and at most one conductor is discharged at any time.

In some embodiments, in each phase period T, one conductor is in the sensing phase S, one conductor is in the charging phase C, and the remaining conductors are in the discharge phase. Advantageously, the grounded conductors (the conductors in the discharge phase) reduce the amount of noise injected into the adjacent conductors.

In some embodiments, in each phase period T, one conductor is in the sensing phase, multiple conductors are in the charging phase, and multiple conductors are in the discharge phase. More generally, any number of conductors can be in the sensing stage, any number of conductors can be in the charging phase, and any number of conductors can be in the discharge phase in one phase period T. Multiple copies of the sensing, charging and discharge circuits can be provided.

The invention is not limited to the embodiments described above. The invention is not limited to embodiments in which the discharging, charging or sensing circuitry is shared among different conductors, or to embodiments with low current driving requirements. The phases Dn, Cn, Sn do not have to be of equal duration. Also, different phases may be overlap or even occur at the same time for a given conductor. For example, the charging and sensing of a conductor can be done at the same time. The phases can be different from those in FIG. 8. The invention is applicable to systems in which the conductors are coupled to the driving (charging) and sensing lines capacitively. See U.S. Pat. No. 4,733,222 issued Mar. 22, 1988 to Evans and incorporated herein by reference. Other embodiments and variations are within the scope of the invention, as described below and defined by the appended claims.

DESCRIPTION OF SOME EMBODIMENTS

Figure 10:
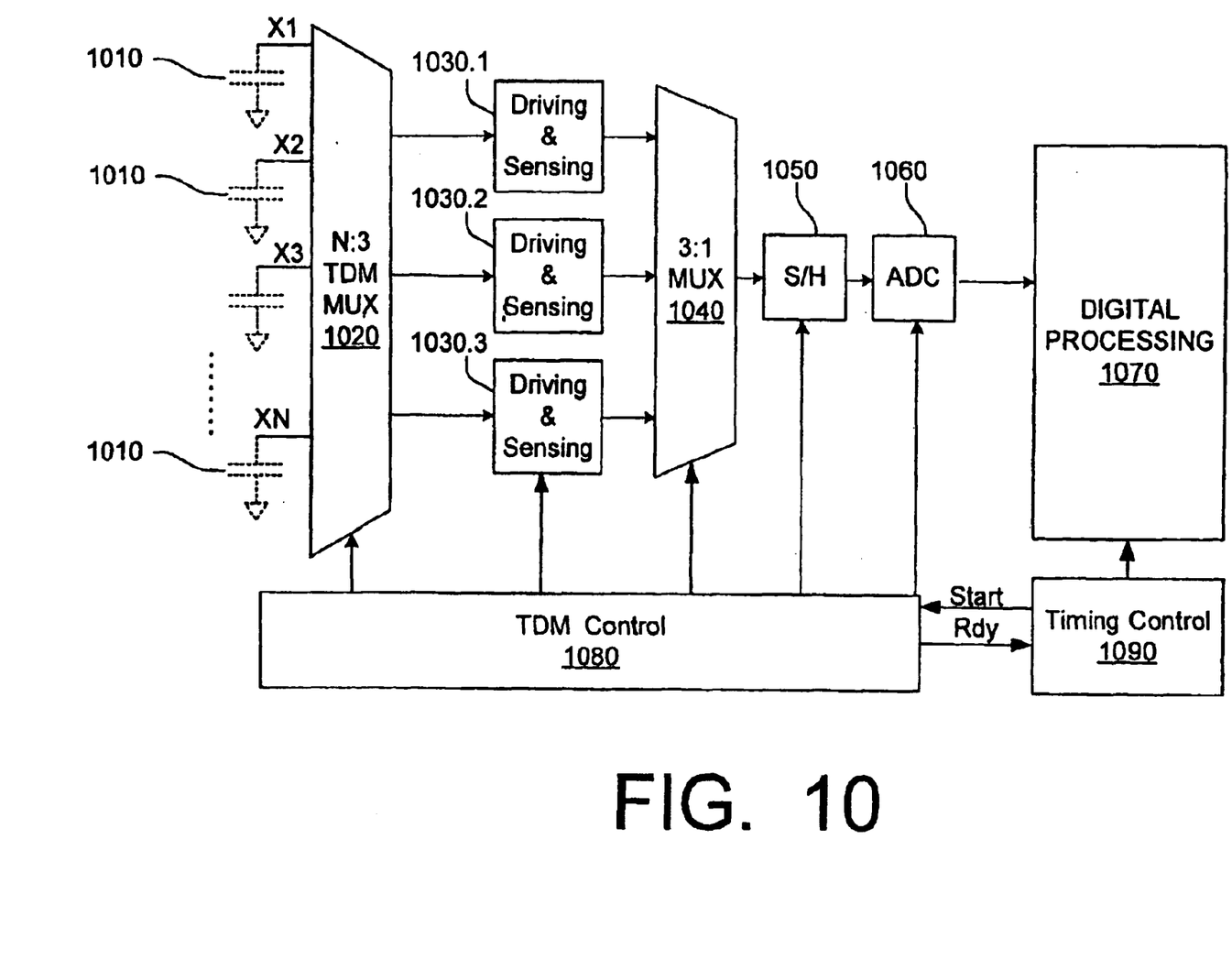
FIG. 10 is a block diagram of sensing and processing circuitry according to some embodiments of the present invention.

FIG. 10 illustrates an example touch sensitive system that implements the timing of FIGS. 8 and 9. Capacitors 1010 schematically represent the capacitances of the respective conductors X1 . . . XN. The capacitors are not actually present in the circuit. The total capacitance of a conductor, as represented by a capacitor 1010, includes a base capacitance (e.g. the capacitance associated with the position of the conductors on a touch pad substrate, which can be a printed circuit board) and a capacitance due to a proximity of a conductive object such as a finger or a stylus.

The conductors can be arranged as in FIG. 1 or in any other suitable fashion. For example, a radial arrangement is possible as in the aforementioned U.S. Pat. No. 4,736,191, incorporated herein by reference. The conductors can be arranged on a flat or curved surface or in any suitable way.

The N conductors are connected to inputs of N:3 multiplexer 1020. In each phase period T (FIG. 9), multiplexer 1020 selects three conductors Xn, Xn+1, Xn+2 for the discharge, charging, and sensing phases. The outputs of MUX 1020 are connected to inputs of respective driving and sensing circuits 1030.1, 1030.2, 1030.3. Each of these circuits performs the discharging, charging, and sensing operations for one selected conductor.

The outputs of circuits 1030 are connected to the respective inputs of 3:1 multiplexer 1040. Multiplexer 1040 selects a circuit 1030 when the circuit is in the sensing phase. The output of multiplexer 1040 is connected to a sample and hold circuit 1050. The output of sample and hold circuit 1050 is connected to the input of analog to digital converter 1060. The output of ADC 1060 is connected to a digital processing circuit 1070 which may perform filtering, calibration, and other processing. ADC 1060 and circuit 1070 are shown for illustration. The invention is not limited to any digital processing functions or their sequence, or to any function being implemented with digital circuitry. For example, the filtering can be performed before the A/D conversion, or can be omitted.

In the example of FIG. 10, the circuits 1020, 1030, 1040, 1050, 1060 are controlled by a time division multiplexing (TDM) control circuit 1080. Digital processing circuit 1070 is controlled by a timing control circuit 1090. Circuit 1090 provides a Start signal to circuit 1080 to start conductor processing. Circuit 1080 asserts a Ready signal Rdy to circuit 1090 near the end of each sensing phase to indicate that data sampled for one conductor are available for digital processing. This control scheme is provided for illustration and is not limiting.

Figure 11:
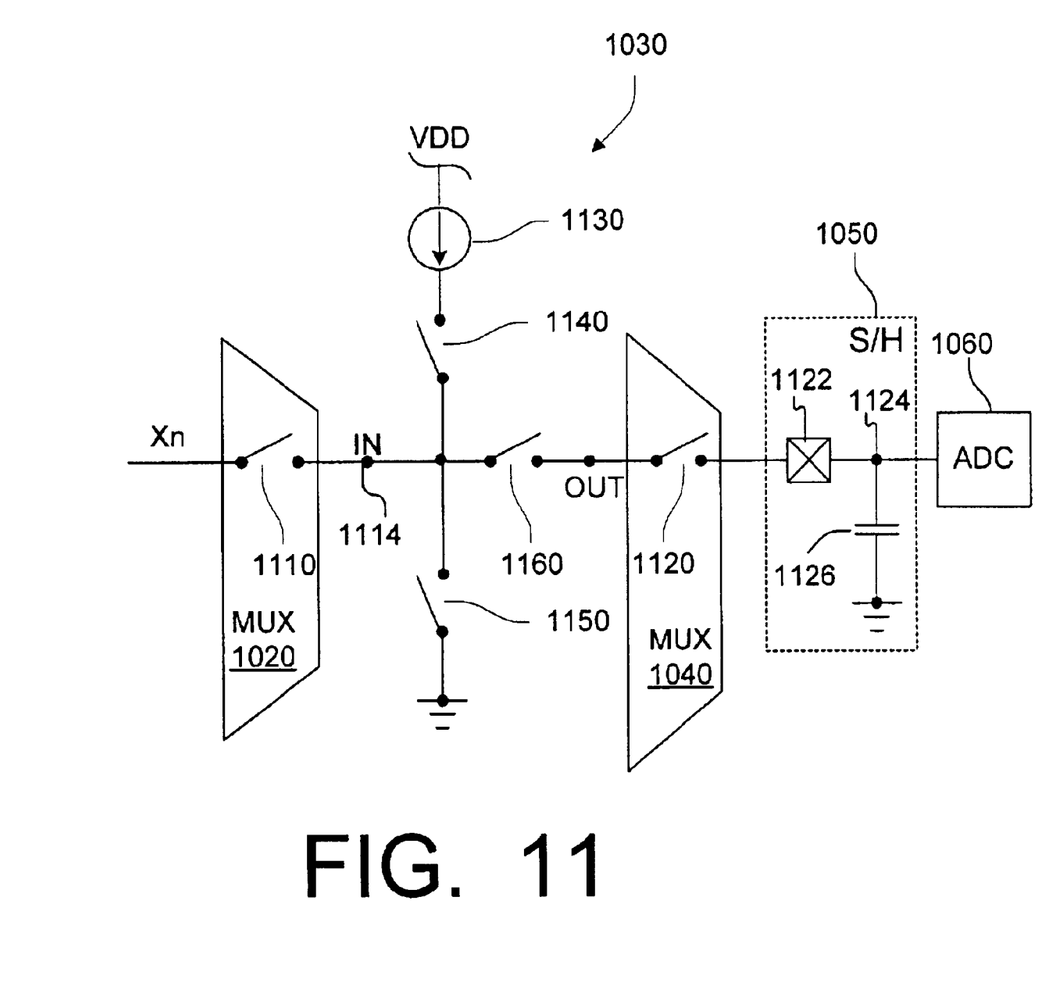
FIG. 11 is a block and circuit diagram of one implementation of a portion of the circuitry of FIG. 10.

Circuits 1030.1, 1030.2, 1030.3 are identical. FIG. 11 illustrates one such circuit. Switch 1110 in TDM multiplexer 1020, when closed, establishes a conductive path between a conductor Xn and an input terminal IN (terminal 1114) of circuit 1030. Switch 1120 in 3:1 MUX 1040 establishes a conductive path between the output terminal OUT of circuit 1030 and the input of S/H circuit 1050. S/H circuit 1050 is shown as a conventional circuit consisting essentially of (i) a pass gate 1122 connected between the output of multiplexer 1040 and the output 1124 of S/H 1050, and (ii) a capacitor 1126 connected between the terminal 1124 and ground. Terminal 1124 is connected to the input of A/D converter 1060. Other types of S/H circuits are also possible.

Terminal IN of circuit 1030 is connected to current source 1130 through switch 1140, to ground through switch 1150, and to terminal OUT through switch 1160. Each switch, when closed, establishes a conductive path between its terminals. The switches can be implemented as transistors, pass gates, or in any other fashion, known or to be invented. The switches and the pass gate 1122 are controlled by TDM control 1080.

In the phase Dn (FIG. 8), switch 1150 is closed and the switches 1140, 1160 are open. Conductor Xn is discharged to ground. In the phase Cn, switch 1140 is closed and switches 1150, 1160 are open for a predetermined interval of time. Current source 1130 sources a predetermined current, injecting a predetermined charge Q into the conductor Xn. The conductor voltage rises to a value V=Q/C, where C is the conductor's capacitance. In the phase Sn, switch 1160 is closed and the switches 1140, 1150 are open. The charge Q becomes shared with the output OUT. At the end of the phase Sn, the switch 1120 is closed, and some of the charge is passed to the input of S/H circuit 1050.

Switch 1110 is closed in all of the three phases Dn, Cn, Sn.

Switch 1160 can be omitted. Terminal IN can be connected directly to multiplexer 1040.

Figure 12:
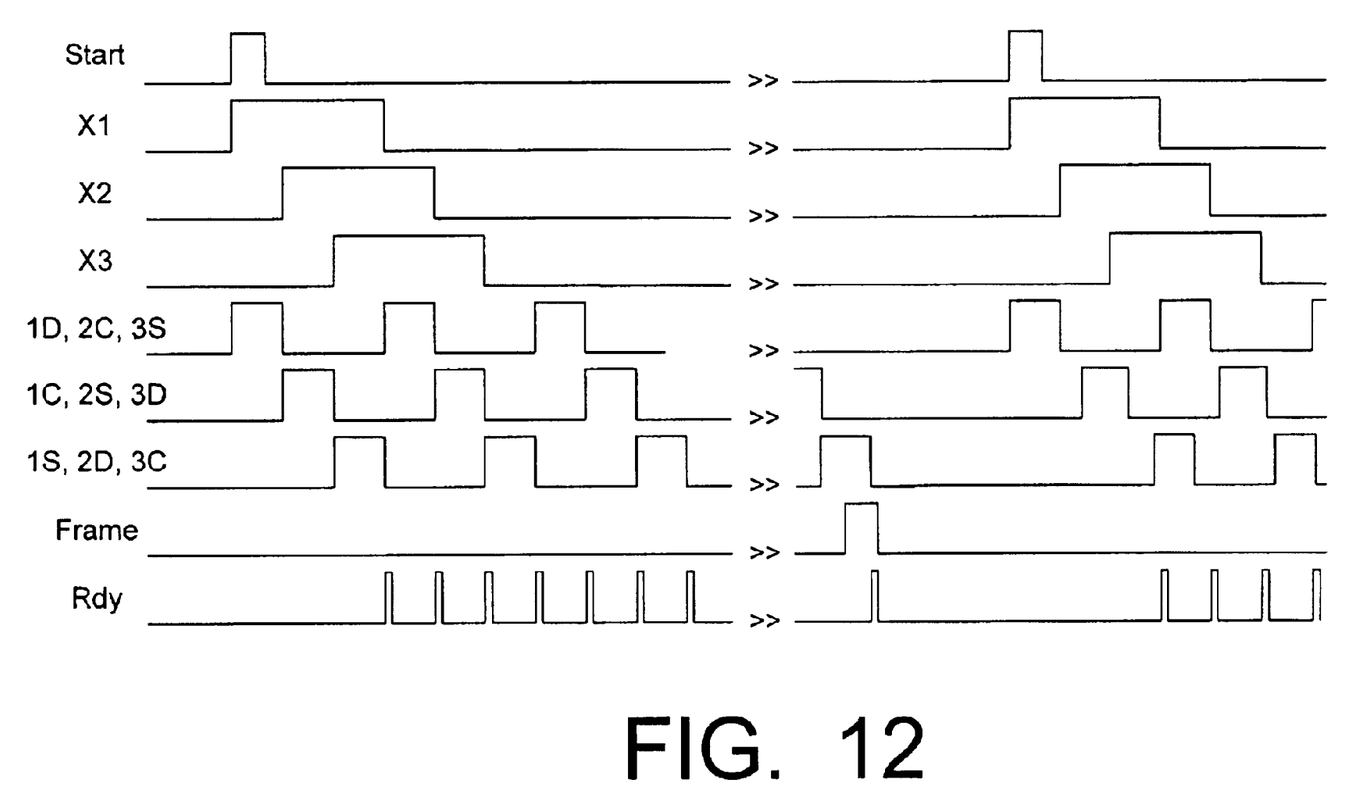
FIG. 12 is a timing diagram obtained in one embodiment of the present invention.

Other timing details are shown in FIG. 12. The conductor scanning operation begins in response to a pulse of the signal Start provided by timing control 1090. In the diagrams labeled X1, X2, X3, a pulse indicates the time when the corresponding conductor is selected by TDM multiplexer 1020. At first, only conductor X1 is selected. Then X2 is selected before deselection of X1, and X3 is selected before deselection of X1 and X2.

In the diagram labeled "1D, 2C, 3S", a pulse indicates the time when the circuit 1030.1 is in the discharge phase, the circuit 1030.2 is in the charging phase, and the circuit 1030.3 is in the sensing phase. A pulse in the "1C, 2S, 3D" diagram indicates the time when the circuit 1030.1 is in the charging phase, the circuit 1030.2 is in the sensing phase, and the circuit 1030.3 is in the discharge phase. A pulse in the "1S, 2D, 3C" diagram indicates the time when the circuit 1030.1 is in the sensing phase, the circuit 1030.2 is in the discharge phase, and the circuit 1030.3 is in the charging phase. In some embodiments, the duration of each phase is 2.5–20.0 μs. Other durations are also possible.

At the end of each sensing phase, signal Rdy is asserted by TDM control 1080 to indicate valid digital data on the output of ADC 1060. The data can be stored in a register (not shown) in circuit 1070, and/or processed in a suitable way.

The Frame signal is asserted by TDM control 1080 to timing control 1090 when the last conductor is being scanned. A new scanning cycle can be initiated by asserting Start. This sequence is exemplary and not limiting. For example, scanning of all of the conductors can be performed multiple times without assertion of a Start signal ("free running mode"). The scanning can be performed with wrap around or in any other order.

Figure 13:
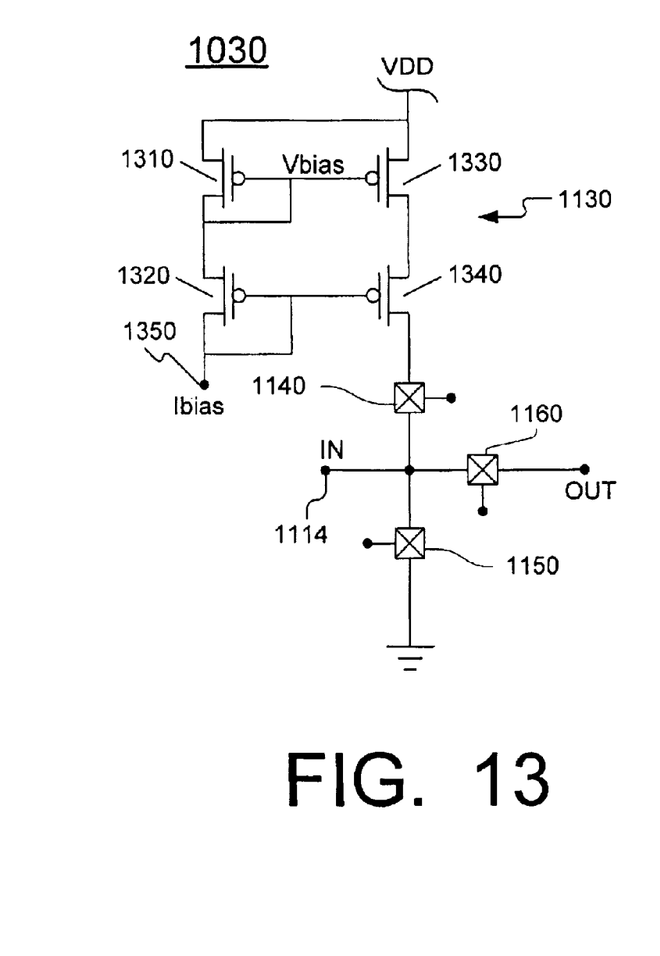
FIGS. 13 and 14 are circuit diagrams for one implementation of a portion of the circuitry of FIG. 10.

FIG. 13 illustrates a circuit diagram for one implementation of circuit 1030 of FIG. 11. Switches 1140, 1150, 1160 are pass gates. A pass gate is a pair of an NMOS transistor and a PMOS transistor connected in parallel between the switch terminals. Current source 1130 includes PMOS transistors 1310, 1320, 1330, 1340 in current mirror configuration. The sources of transistors 1310, 1330 are connected to a positive voltage supply VDD. The gates of the two transistors are connected to each other and to the drain of transistor 1310. The drain of transistor 1310 is connected to the source of transistor 1320. The gate of transistor 1320 is connected to its drain and to the gate of transistor 1340. The drain of transistor 1320 is connected to output terminal 1350 of a current source 1404 (FIG. 14) that sinks a constant current Ibias from terminal 1350. The circuit of FIG. 13 is exemplary and not limiting.

The drain of transistor 1330 is connected to the source of transistor 1340. The drain of transistor 1340 is connected to switch 1140.

Figure 14:
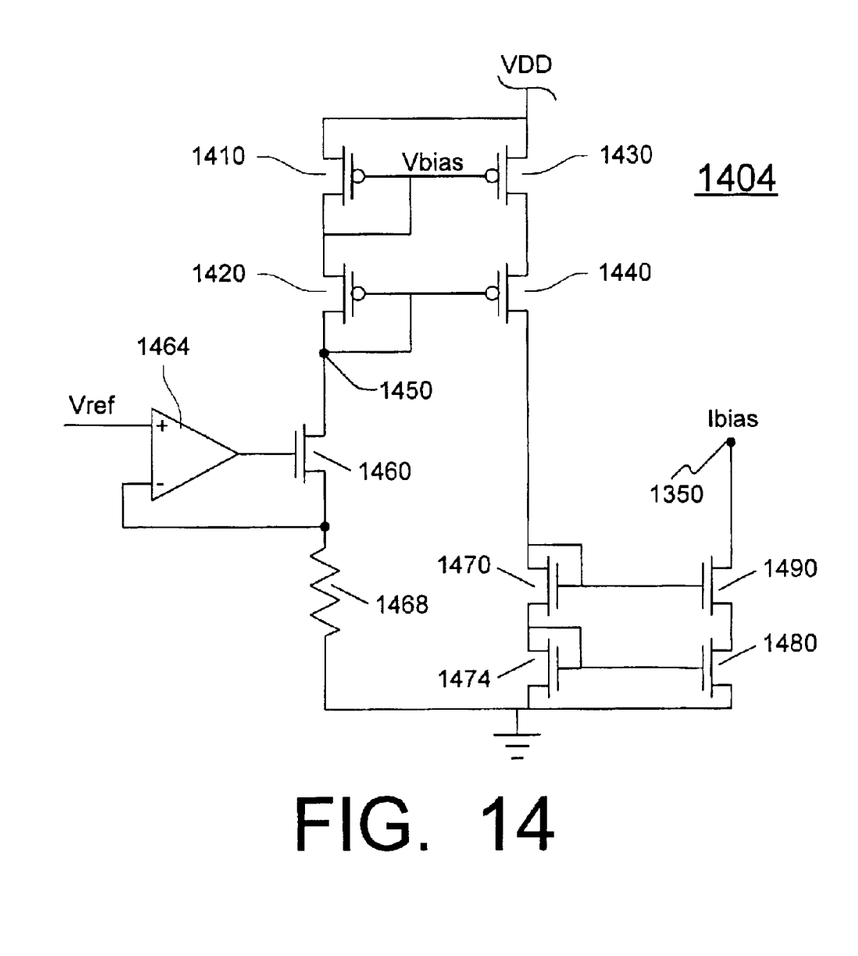

Current source 1404 includes PMOS transistors 1410, 1420, 1430, 1440 in current mirror configuration. The sources of transistors 1410, 1430 are connected to VDD. The gates of the two transistors are connected to each other and to the drain of transistor 1410. The drain of transistor 1410 is connected to the source of transistor 1420. The gate of transistor 1420 is connected to its drain 1450 and to the gate of transistor 1440. The source of transistor 1440 is connected to the drain of transistor 1430. The circuit of FIG. 14 is exemplary and not limiting.

The drain node 1450 of transistor 1420 is connected to the drain of NMOS transistor 1460. The gate of transistor 1460 is connected to the output of operational amplifier 1464. The positive input terminal of amplifier 1464 receives a positive reference voltage Vref. The negative input terminal of amplifier 1464 is connected to the source of transistor 1460 and to one terminal of resistor 1468. The other terminal of resistor 1468 is connected to ground.

The current through transistor 1410 is mirrored to the drain of transistor 1440. The drain of transistor 1440 is connected to the drain and the gate of NMOS transistor 1470. The source of transistor 1470 is connected to the drain and the gate of NMOS transistor 1474. The source of transistor 1474 is connected to ground. The gate of transistor 1474 is connected to the gate of NMOS transistor 1480 whose source is connected to ground. The drain of transistor 1480 is connected to the source of NMOS transistor 1490. The gate of transistor 1490 is connected to the gate of transistor 1470. The drain of transistor 1490 is connected to terminal 1350.

Current Ibias at the drain of transistor 1440 is mirrored to terminal 1350 by the current mirror formed by NMOS transistors 1470, 1474, 1480, 1490.

Figure 15:
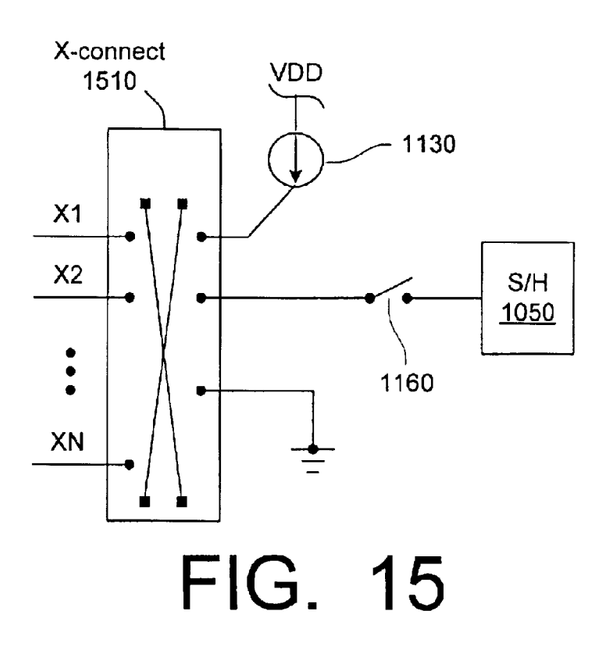
FIG. 15 is a block and circuit diagram according to an embodiment of the present invention.

In some embodiments, current source 1404 is shared by circuits 1030.1, 1030.2, 1030.3. Current source 1130, and other circuitry, can also be shared as shown in FIG. 15. Multiplexers 1020, 1040 are replaced with a cross connect circuit 1510 having N inputs connected to the respective conductors X1, . . . XN. Circuit 1510 has three outputs connected, respectively, to the output of current source 1130, a ground terminal, and one terminal of switch 1160. The other terminal of switch 1160 is connected to the input of S/H circuit 1050. Under the control of TDM circuit 1080, the cross connect 1510 simultaneously selects three conductors and connects one of the conductors to ground for the discharge phase, one of the conductors to current source 1130 for the charging phase, and one of the conductors to switch 1160 for the sensing stage.

In some embodiment, switch 1160 is omitted, and the corresponding output of cross connect 1510 is connected directly to the input of S/H 1050.

In some embodiments, the driving and sensing circuits 1030 are identical to the charge integrators 410 (FIG. 4) described in the aforementioned U.S. Pat. No. 5,914,465. These circuits operate as follows. First the conductor connected to such a circuit 1030 is shorted to a voltage VDD. Then the circuit 1030 discharges the conductor with a constant current for a fixed period of time. The resulting conductor voltage appears on a plate of a capacitor. Then the conductor is shorted to ground, and then charged with a constant current for a fixed period of time. The resulting conductor voltage appears on a plate of another capacitor. The voltages on the two plates of the two capacitors are averaged. The averaged voltage is passed to S/H 1050.

In other embodiments, each circuit 1030 operates like the processing circuitry of FIG. 2 (measuring the time that it takes to change the conductor voltage from one value, e.g. ground, to another value). In some embodiments, circuits 1030 sense the conductor states by sensing a current through the conductor or some other physical parameter. Other variations are possible, known or to be invented.

Figure 16:
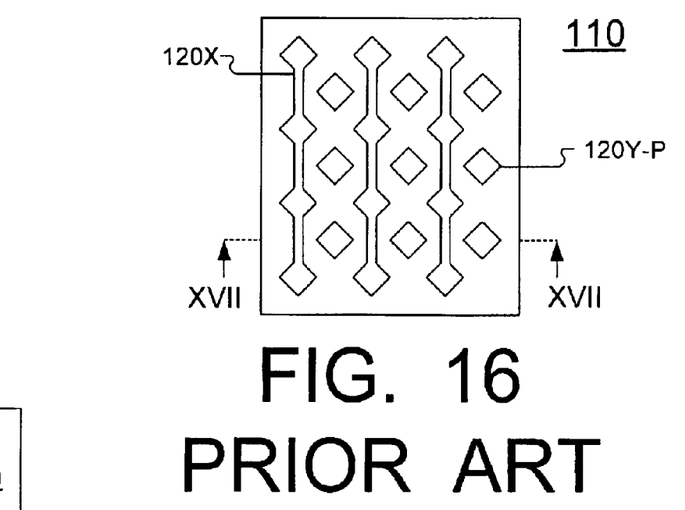
FIG. 16 is a top view of a prior art touch sensitive pad suitable for use with some embodiments of the present invention.
Figure 17:
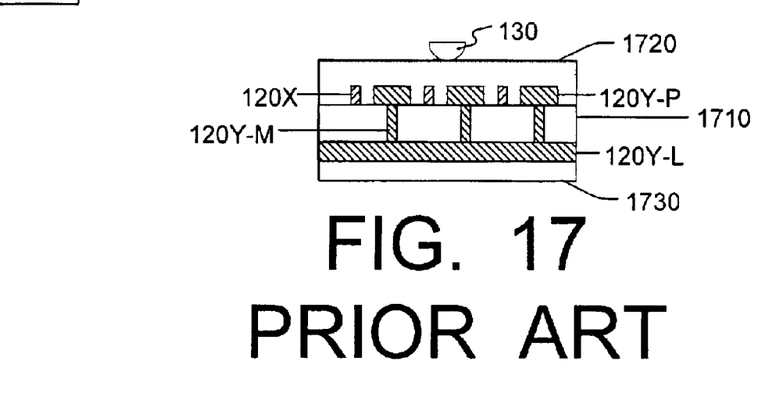
FIG. 17 is a cross sectional view of the pad of FIG. 16.

FIGS. 16–17 illustrated an exemplary prior art touch pad 110 used in some embodiments of the invention. FIG. 16 is a top view showing the conductors 120X and also showing diamond shaped pads 120Y-P which are part of conductors 120Y. FIG. 17 is a cross section along the line XVII—XVII in FIG. 16. Conductors 120X and pads 120Y-P are conductive traces (e.g. copper) formed on an insulating printed circuit board (PCB) 1710. Conductors 120Y also include the conductive traces 120Y-L on the bottom surface of PCB 1710. Each trace 120Y-L is connected to one row of pads 120Y-P by metal plugs 120Y-M formed in through holes in PCB 1710. Dielectric 1720 is formed over the traces 120X, 120Y-P. Dielectric 1720 separates these traces from a finger or stylus 130. Dielectric 1730 formed underneath PCB 1710 over the traces 120Y-L.

Other suitable touch pad and touch surface structures and features are described in U.S. Pat. Nos. 5,914,465; 4,736,191 and 4,639,720, which are incorporated herein by reference. Other touch pad structures, including three-dimensional structures, one-dimensional structures, and other structures, known or to be invented, can also be suitable.

The invention is not limited to sensing a human finger or a stylus, but extends to sensing other types of objects. The invention is not-limited to the circuits and structures described above, but is defined by the appended claims.

What is claimed is:

1. A method for sensing an object with a plurality of conductors, wherein the object is capable of changing one or more characteristics of each of said conductors, the method comprising:
   (a) selecting conductors from said plurality of conductors and coupling the selected conductors to one or more first circuits to place the selected conductors into states indicative of the one or more characteristics of the selected conductors;
   (b) after coupling the selected conductors to the one or more first circuits, coupling the selected conductors to one or more first node to develop first signals on the one or more first nodes, the first signals being indicatibe of the one or more characteristics of the selected coductors; and
   (c) deselecting the conductors to select other conductors for coupling to the one or more first nodes and the one or more first circuits, wherein the deselected conductors are not coupled to the one or more first circuits and the one or more first nodes;
   wherein for at least a first conductor and a second conductor which are two of said conductors, a time period when the first conductor is coupled to at least one of the one or more first nodes overlaps with a time period when the second conductor to at least one of the one or more first circuits.

2. The method of claim 1 wherein the first signals are indicative of the selected conductors' capacitance.

3. The method of claim 1 wherein the one or more characteristics of each conductor are indicative of a presence of the object adjacent to the conductor.

4. The method of claim 1 wherein the conductors are located at a surface, and the one or more characteristics of each conductor are indicative of a pressure of the object on the surface at a location proximate to the conductor.

5. The method of claim 1 wherein the second conductor is selected after the selection of the first conductor and before the deselection of the first conductor.

6. The method of claim 5 wherein the first and second conductors remain selected for equal lengths of time.

7. The method of claim 1 wherein the second conductor is not selected during a time period when the first conductor is coupled to at least one of the one or more first circuits.

8. The method of claim 1 wherein the first conductor is deselected when the second conductor is coupled to at least one of the one or more first nodes.

9. The method of claim 1 wherein the operation (a) comprises, for each selected conductor:
   (a1) injecting a predetermined amount of electrical charge into selected conductor.

10. The method of claim 9 wherein the operations (a1) and (b) are of equal duration for each selected conductor, and the operation (b) for the first conductor coincides in time with the operation (a1) for the second conductor.

11. The method of claim 9 wherein the operation (a) further comprises, for each selected conductor, before the operation (a1):
   (a0) coupling the selected conductor to a predetermined voltage;
   wherein the operation (a1) for first conductor overlaps with the operation (a0) for the second conductor.

12. The method of claim 11 wherein the operation (b) for the first conductor overlaps with the operation (a0) for a third conductor selected after the second conductor.

13. The method of claim 11 wherein the operations (a0) and (a1) are of equal duration for each selected conductor, and the operation (a1) for the first conductor coincides in time with the operation (a0) for the second conductor.

14. The method of claim 13 wherein the operations (a0), and (a1) and (b) are of equal duration for each selected conductor, and the operation (b) for first conductor coincides in time with the operation (a1) for the second conductor and with the operation (a0) for a third conductor selected after the second conductor.

15. The method of claim 1 further comprising coupling the one or more first nodes to an input of a circuit comprising an analog to digital converter shared by all of the conductors.

16. The method of claim 1 wherein at most one conductor is coupled to any one of the one or more first nodes at any time.

17. The method of claim 1 wherein each selected conductor is not coupled to any one of the one or more first circuits when the selected conductor is coupled to any one of the one or more first nodes.

18. An apparatus for sensing an object with a plurality of conductors, wherein the object is capable of changing one or more characteristics of each of said conductors, the apparatus comprising:
   one or more first circuits for placing the conductors into states indicative of the conductors' one or more characteristics;
   one or more first nodes for providing first signals indicative of the one or more characteristics of the selected conductors; and
   circuit for:
   (a) selecting conductors from said plurality of conductors and coupling the selected conductors to the one or more first circuits to place the selected conductors into said states indicative of the one or more characteristics of the selected conductors;
   (b) after coupling the selected conductors to the one or more first circuits, coupling the selected conductors to the one or more first nodes to develop first signals on the one or more first nodes, the first signals being indicative of the one or more characteristics of the selected conductors; and (c) deselecting the conductors to select other conductors for coupling to the one or more first nodes and the one or more first circuits, wherein the deselected conductors are not coupled to the one or more first circuits and the one or more first nodes;

wherein for at least a first conductor and a second conductor which are two of said conductors, a time period when the first conductor is coupled to at least one of the one or more first nodes overlaps with a time period when the second conductor is coupled to at least one of the one or more first circuits.

19. The apparatus of claim 18 wherein the first signals are indicative of the selected condutors' capacitance.

20. The apparatus of claim 18 in combination with the conductors, wherein the one or more characteristics of each conductor are indicative of a presence of the object adjacent to the conductor.

21. The apparatus of claim 18 in combination with the conductors, wherein the conductors are located at a surface, and the one or more characteristics of each conductor are indicative of a pressure of the object on the surface at a location proximate to the conductor.

22. The apparatus of claim 18 wherein the second conductor is selected after the selection of the first conductor and before the deselection of the first conductor.

23. The apparatus of claim 22 wherein the first and second conductors remain selected for equal lengths of time.

24. The apparatus of claim 18 wherein the second conductor is not selected during a time period when the first conductor is coupled to at least one of the one or more first circuits.

25. The apparatus of claim 18 wherein the first conductor is deselected when the second conductor is coupled to at least one of the one or more first nodes.

26. The apparatus of claim 18 wherein the operation (a) comprises, for each selected conductor:

(a1) injecting a predetermined amount of electrical charge into the selected conductor.

27. The apparatus of claim 26 wherein the operations (a1) and (b) are of equal duration for each selected conductor, and the operation (b) for the first conductor coincides in time with the operation (a1) for the second conductor.

28. The apparatus of claim 26 wherein the operation (a) further comprises, for each selected conductor, before the operation (a1):

(a0) coupling the selected conductor to a predetermined voltage;

wherein the operation (a1) for first conductor overlaps with the operation (a0) for the second conductor.

29. The apparatus of claim 28 wherein the operation (b) for the first conductor overlaps with the operation (a0) for a third conductor selected after the second conductor.

30. The apparatus of claim 28 wherein the operation (a0) and (a1) are of equal duration for each selected conductor, and the operation (a1) for the first conductor coincides in time with the operation (a0) for the second conductor.

31. The apparatus of claim 30 wherein the operations (a0), (a1) and (b) are of equal duration for each selected conductor, and the operation (b) for the first conductor coincides in time with the operation (a1) for the second conductor and with the operation (a0) for a third conductor selected after the second conductor.

32. The apparatus of claim 18 wherein said circuitry couples the one or more first nodes to an input of a circuit comprising an analog to digital converter shared by all of the conductors.

33. The apparatus of claim 18 wherein at most one conductor is coupled to any one of the one or more first nodes at any time.

34. The apparatus of claim 18 wherein each selected conductor is not coupled to any one of the one or more first circuits when the selected conductor is coupled to any one of the one or more first nodes.

* * * * *